United States Patent
Drucker et al.

(10) Patent No.: US 12,395,316 B2
(45) Date of Patent: Aug. 19, 2025

(54) HOMOMORPHIC ENCRYPTED ONE-HOT MAPS USING INTERMEDIATE CHINESE REMAINDER THEOREM (CRT) MAPS

(71) Applicant: International Business Machines Corporation, Armonk, NY (US)

(72) Inventors: Nir Drucker, Zichron Yaakov (IL); Ramy Masalha, Kafr Qari (IL); Hayim Shaul, Kafr Saba (IL)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 18/196,687

(22) Filed: May 12, 2023

(65) Prior Publication Data

US 2024/0380569 A1  Nov. 14, 2024

(51) Int. Cl.
  H04L 29/06  (2006.01)
  H04L 9/00  (2022.01)

(52) U.S. Cl.
  CPC .................. H04L 9/008 (2013.01)

(58) Field of Classification Search
  CPC .................. H04L 9/008; H04L 2209/46
  See application file for complete search history.

(56) References Cited

U.S. PATENT DOCUMENTS

| | | |
|---|---|---|
| 9,436,835 B1 | 9/2016 | Saldamli |
| 10,211,975 B2 | 2/2019 | Loftus et al. |
| 2020/0389303 A1* | 12/2020 | Kim ............... H04L 63/0861 |
| 2021/0376995 A1 | 12/2021 | Ratha |
| 2022/0224515 A1* | 7/2022 | Yampolsky ........... G06F 16/245 |
| 2022/0321321 A1 | 10/2022 | Ghosh et al. |
| 2023/0327856 A1* | 10/2023 | Lu ........................... H04L 9/085 713/171 |
| 2024/0330500 A1* | 10/2024 | Zaret ..................... G06F 21/602 |

FOREIGN PATENT DOCUMENTS

| | | | | |
|---|---|---|---|---|
| IN | 201102903 I1 | * | 4/2023 | |
| KR | 20230076723 A | * | 5/2023 | ............... G06F 9/28 |

OTHER PUBLICATIONS

Zheng, Zhiyong, Fengxia Liu, and Kun Tian. "An unbounded fully homomorphic encryption scheme based on ideal lattices and Chinese remainder theorem." arXiv preprint arXiv:2301.12060 (2023). (Year: 2023).*

Kim et al., "CRT-based Fully Homomorphic Encryption over the Integers,".

(Continued)

Primary Examiner — Shawnchoy Rahman
(74) Attorney, Agent, or Firm — Michael O'Keefe

(57) ABSTRACT

A method, apparatus and computer program product for privacy-preserving homomorphic inferencing using one-hot data representations. In this approach, a client interacting with a cloud-based server submits one-hot maps of a Chinese Remainder Theorem (CRT)-based representation of an data element, and the server expands these maps in an online phase to obtain a full one-hot map for the element. After the server obtains the full one-hot map, it performs an operation, e.g., a comparison operation associated with inferencing on a decision tree, on the one-hot map under homomorphic encryption, and in response generates a result. The result is provided back to the client.

20 Claims, 7 Drawing Sheets

(56) References Cited

OTHER PUBLICATIONS

Aharoni, et al., "HeLayers: A Tile Tensors Framework for Large Neural Networks on Encrypted Data," arXiv:2011.01805v3 [cs.CR] Jan. 1, 2023.
Aslett, et al., "Encrypted statistical machine learning: new privacy preserving methods," arXiv:1508.06845v1 [stat.ML] Aug. 27, 2015.
Brakerski, et al., "Fully homomorphic encryption without bootstrapping," ACM Transactions on Computation Theory (TOCT), 6(3):1-36, 2014. doi:10.1145/2633600.
Cheon, et al., "Homomorphic encryption for arithmetic of approximate numbers," International Association of Cryptographic Research, 2017.
Aharoni et al., "Generating One-Hot Maps under Encryption", arXiv:2306.06739v1, Jun. 11, 2023, pp. 1-21.
Sav et al., "Poseidon: Privacy-Preserving Federated Neural Network Learning", arXiv:2009.00349, Sep. 1, 2020, pp. 1-24.
International Search Report, PCT Application No. IB2024/052671, dated Jun. 20, 2024, 14 pages.

\* cited by examiner

EXAMPLE   LET $n=2 \cdot 3 \cdot 5=30$ WHERE $n_1=2$, $n_2=3$, $n_3=5$ THEN THE ONE-HOT REPRESENTATION OF THE NUMBER 17 IS (0, 0, 0, 0, 0, 0, 0, 0, 0, 0, 0, 0, 0, 0, 0, 0, 1, 0, 0, 0, 0, 0, 0, 0, 0, 0, 0, 0, 0, 0) ← 600

AND THE ASSOCIATED CRT MAPS ARE:

$o_{a,1}$=(0, 1)         $o_{a,2}$=(0, 0, 1)         $o_{a,3}$=(0, 0, 1, 0, 0)   } 602

WHICH CONTAINS ONLY $\sum_i n_i = 2+3+5=10$ ELEMENTS. TO CONSTRUCT THE FULL MAP FROM THE CRT MAPS WE DUPLICATE THE ENTRIES OF $o_{a,1}$, $o_{a,2}$, AND $o_{a,3}$, 30/2=15, 30/3=10, AND 30/5=6 TIMES, RESPECTIVELY AS FOLLOWS $o^d_{a,1}$=(0, 1, 0, 1, 0, 1, 0, 1, 0, 1, 0, 1, 0, 1, 0, 1, 0, 1, 0, 1, 0, 1, 0, 1, 0, 1, 0, 1, 0, 1)

$o^d_{a,2}$=(0, 0, 1, 0, 0, 1, 0, 0, 1, 0, 0, 1, 0, 0, 1, 0, 0, 1, 0, 0, 1, 0, 0, 1, 0, 0, 1, 0, 0, 1)   } 604

$o^d_{a,3}$=(0, 0, 1, 0, 0, 0, 0, 1, 0, 0, 0, 0, 1, 0, 0, 0, 0, 1, 0, 0, 0, 0, 1, 0, 0, 0, 0, 1, 0, 0)

FINALLY, WE COMPUTE $o_a$=(0, 0, 0, 0, 0, 0, 0, 0, 0, 0, 0, 0, 0, 0, 0, 0, 1, 0, 0, 0, 0, 0, 0, 0, 0, 0, 0, 0, 0, 0) ← 606

AS EXPECTED.

FIG. 6

EXAMPLE    LET $n=10{,}000$ AND $a=5{,}678$, THEN THE HIERARCHIES ARE $$700 \begin{cases} n_1 = \left[\sqrt{n}\right] = 100 & n_2 = 101 & m_1 = 201 \\ n_{11} = \left[\sqrt{100}\right] = 10 & n_{21} = \left[\sqrt{101}\right] = 11 & \\ n_{12} = 11 & n_{22} = 12 & m_2 = 44 \\ n_{111/112/121/122} = [4, 5, 4, 5] & n_{211/212/221/222} = [4, 5, 4, 5] & m_3 = 36 \end{cases}$$

TO ENCODE $a$ THE CLIENT COMPUTES 8 RESIDUES VALUES $$702 \begin{cases} a_1 = a \pmod{n_1} = 78 & a_2 = a \pmod{n_2} = 22 \\ a_{11} = a_1 \pmod{n_{11}} = 8 & a_{12} = a_1 \pmod{n_{21}} = 0 \\ a_{12} = a_2 \pmod{n_{12}} = 1 & a_{22} = a_2 \pmod{n_{22}} = 10 \\ a_{111/112/121/122} = [0, 3, 1, 1] & a_{211/212/221/222} = [0, 0, 2, 0] \end{cases}$$

AND THEIR RESPECTIVE MAPS:

$$704 \begin{cases} o_{a,1*} = ((1, 0, 0, 0), (0, 0, 0, 1, 0), (0, 1, 0, 0), (0, 1, 0, 0, 0)) \\ o_{a,2*} = ((1, 0, 0, 0), (1, 0, 0, 0, 0), (0, 0, 1, 0), (1, 0, 0, 0, 0)) \end{cases}$$

FIG. 7

HOMOMORPHIC ENCRYPTED ONE-HOT MAPS USING INTERMEDIATE CHINESE REMAINDER THEOREM (CRT) MAPS

BACKGROUND OF THE INVENTION

Technical Field

This disclosure relates generally to the use of homomorphic encryption operations to facilitate inferencing against encrypted data.

Background of the Related Art

Homomorphic encryption is a form of encryption that permits users to perform computations on encrypted data without first decrypting that data. The computations are left in an encrypted form which, when decrypted, results in an identical output to that produced had the operations been performed on the unencrypted data. Recently, Privacy-Preserving Machine Learning (PPML) solutions have leveraged HE to obviate porting of sensitive data to the cloud. A solution of this type typically involves two entities: a user (the client), and a semi-honest cloud server that performs machine learning computation on HE-encrypted data. The user can train a model locally, encrypt it, and upload it to the cloud. In such case, the model architecture is not considered a secret from the user, only the cloud. Alternatively, the user can ask the cloud to train a model on its behalf over encrypted/unencrypted data and, at a later stage, the cloud performs inference operations on the user's behalf using the trained model. In some scenarios, the model is a secret and is not revealed to the user, who only receives the classification or prediction output.

Some modern HE schemes, e.g., Cheon-Kim-Kim-Song (CKKS) and Brakerski-Gentry-Vaikuntanathan (BGV), support only basic arithmetic operations of addition and multiplication. This means that an algorithm that cannot be represented as a composition of these arithmetic operations cannot be computed directly in HE.

Some HE schemes, such as CKKS, operate on ciphertexts in a homomorphic single instruction multiple data (SIMD) fashion. This means that a single ciphertext encrypts a fixed-size vector, and the homomorphic operations on the ciphertext are performed slot-wise on the elements of the plaintext vector. To utilize the SIMD feature, it is necessary to pack and encrypt more than one input element in every ciphertext. The packing method can dramatically affect the latency (i.e., time to perform computation), throughput (i.e., number of computations performed in a unit of time), communication costs, and memory requirements.

Branching over encrypted data is often considered inefficient due to the latency of the comparison operators. To this end, when implementing an analytic that involves many branches, such as decision trees and extreme gradient boosting (XGBoost), it is better to use the fastest comparators that are available. The most efficient comparators are binary comparators that only compare one bit of data at a time. This has led many implementations over HE to prefer using "one-hot" encoding for the input data. A one-hot encoding is known as a map that takes an integer "a" to a vector of zeros, where only the element at position "a" is one. In addition, it is possible to extend one-hot maps to greater-then or less-equal masks that allow performing inequalities.

Currently, there are several known methods for achieving one-hot maps from categorical variables with N categories. A first method is to ask the client to directly encode every element as a one-hot map, i.e., every ciphertext includes N slots that represent an element. In practice, multiple one-hot maps can be packed side by side in one ciphertext. The issue with this method is that it is wasteful in bandwidth, assuming that N is of medium size e.g., N=100 will cause the client to encode 99 zeros and one 1 to represent just one element. When the network transport and storage costs are large, this method is unfavorable. Another option is for the client to submit every element in its integer representation. Here, the bandwidth and storage costs are low, but transforming this representation to a one-hot map representation is costly in terms of latency. It requires at least log(N) rotations to duplicate every element to all possible positions of the one-hot map; further, transformation requires running N costly isEqual operations or otherwise running some optimization like polynomial interpolation (that has multiplication-depth of at least O(log N) and requires at least N multiplications). This cost increases significantly when N is large.

There remains a need to provide for bandwidth- and latency-efficient methods for generating and using one-hot maps for decision tree-based inferencing.

BRIEF SUMMARY

According to a first aspect of this disclosure, a method for secure computations under Homomorphic Encryption (HE) is implemented on a processor, e.g., at a server that performs Machine Learning (MIL) computation on HE-encrypted data. The method begins with the server receiving from a client an encrypted data point that encrypts one or more elements. In a representative use case, at least one element is associated with a plaintext number. Advantageously, the plaintext number is represented in the encrypted data point as a set of (relatively small) one-hot maps, each of the set of one-hot maps corresponding to a coprime factor computed for the plaintext number using a Chinese Remainder Theorem (CRT) encoding. Using the set of small one-hot maps (sometimes referred to herein as CRT "intermediate" maps), and under homomorphic encryption, a one-hot map representation of the plaintext number is then generated. Relative to the size of the one-hot map representation, the aggregate size of the set of one-bot maps is significantly less. Thus, while the generation operation on the server has some processing latency, that latency is still less than the latency that would otherwise be required to generate the one-hot map representation from the plaintext number directly. After the server obtains the full one-hot map, the server then performs an operation on the one-hot map representation (of the plaintext number) under homomorphic encryption, and in response generates a result. A representative operation is a comparison operation associated with evaluation of a decision tree for a CKKS-based HE scheme. The result is provided back to the client as a response to the encrypted data point.

In a variant embodiment, the CRT encoding is hierarchical, and in such case the generation of the one-hot map representation is recursively repeated at each hierarchy. For further efficiency, the client may pack multiple elements together according to a packing scheme prior to their delivery to the server, in which case the server unpacks the elements as needed prior to generating the one-hot representation(s).

According to a second aspect of this disclosure, an apparatus comprises a processor, and computer memory. The computer memory holds computer program instructions executed by the processor for secure computations under HE. The computer program instructions comprise program code configured to perform operations such as the steps described above.

According to a third aspect of this disclosure, a computer program product in a non-transitory computer readable medium is provided. The computer program product holds computer program instructions executed by a processor in a host processing system configured for HE-based secure computations. The computer program instructions comprise program code configured to perform operations such as the steps described above.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which:

FIG. 6 depicts an example of the first embodiment;

FIG. 7 depicts an example of the second embodiment; and

DETAILED DESCRIPTION OF AN ILLUSTRATIVE EMBODIMENT

Figure 1:
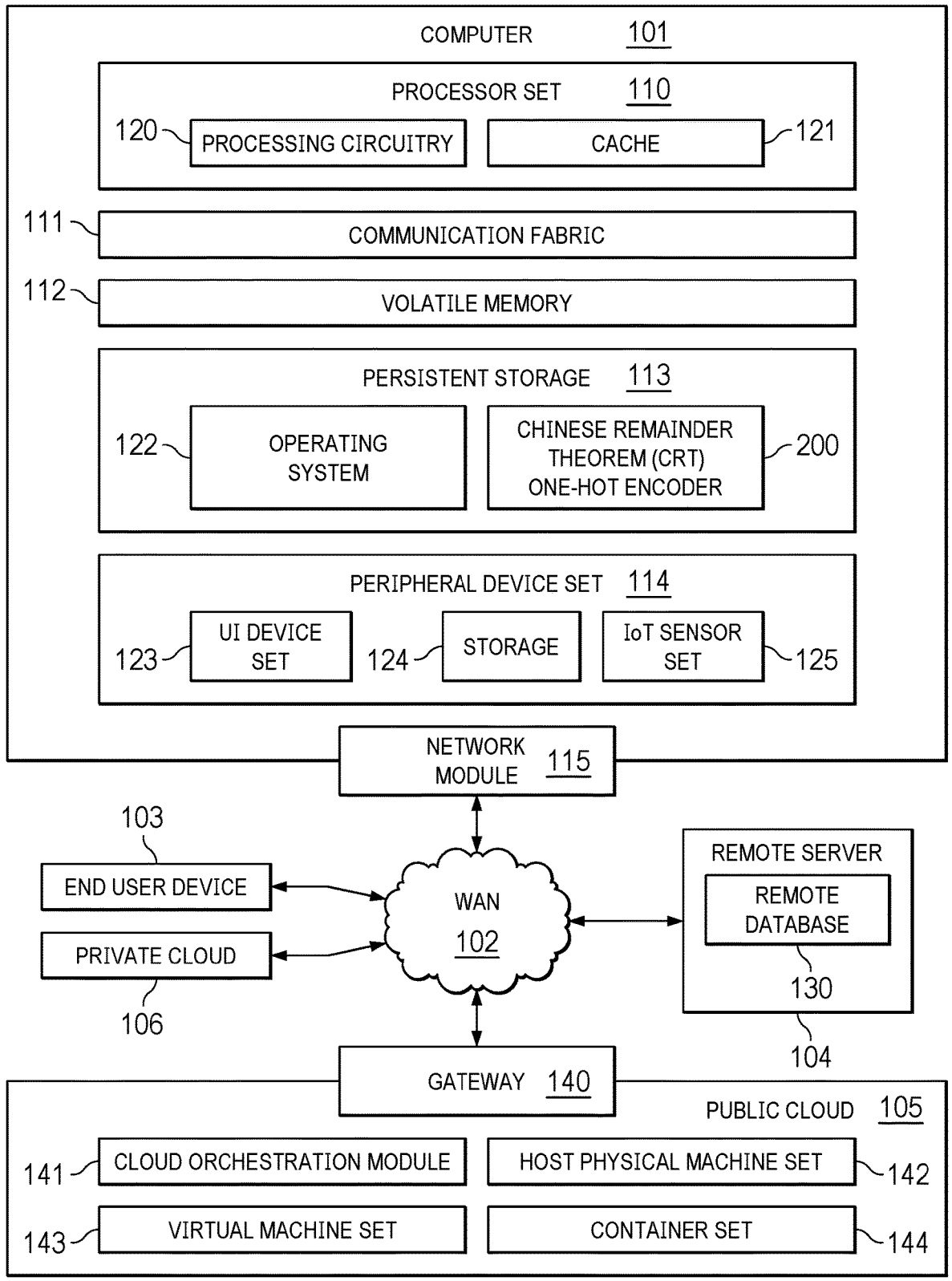
FIG. 1 depicts an exemplary block diagram of a data processing system in which exemplary aspects of the illustrative embodiments may be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as one-hot map encoder code 200 of this disclosure that facilitates generation and use of homomorphic-encrypted one-hot maps using intermediate Chinese Remainder Theorem (CRT) maps. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as Linux, various known proprietary operating systems or open source Portable Operating System Interface-type operating systems that employ a kernel. The code included in block 200 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Homomorphic Encryption

Homomorphic encryption (HE) is a public-key encryption scheme that in addition to the usual functions Enc, Dec (see below) also provides functions to perform operations on encrypted data (usually addition and multiplication). The encryption operation Enc: $\mathcal{R}_1 \rightarrow \mathcal{R}_2$ encrypts input plaintext from the ring $\mathcal{R}_1(+,*)$ into ciphertexts in the ring $\mathcal{R}_2(\oplus,\odot)$, and its associated decryption operation is Dec:: $\mathcal{R}_2 \rightarrow \mathcal{R}_1$. An HE scheme is correct if for every valid input x, y $\in \mathcal{R}_1$:Dec (Enc (x))=x, Dec (Enc (x)$\oplus$Enc (y))=x+y, and Dec (Enc (x)$\odot$Enc (y))=x*y, and is approximately correct (as in CKKS) if for some small $\in$>0 that is determined by the key, it follows that |x−Dec (Enc (x))|≤$\in$. The addition and multiplication equations are modified in the same way. For schemes that support SIMD (Single Instruction Multiple Data), additions and multiplications are applied slot-wise on vectors.

Several HE schemes have been proposed based on hardness of a computational problem known as Ring Learning with Errors (RLWE). Prominent examples of such schemes include BFV (Brakerski/Fan-Vercauteren), BGV (Brakerski-Gentry-Vaikuntanathan), and CKKS (Cheon-Kim-Kim-Song) schemes, which schemes (named after the original proposers) are both additively and multiplicatively homomorphic. While the BFV and BGV schemes are efficient for vector operations over integers, the CKKS scheme is more appropriate for "approximate" (limited precision) floating-point operations.

Some HE schemes, such as CKKS, operate on ciphertexts in a homomorphic Single Instruction Multiple Data (SIMD) fashion. This means that a single ciphertext encrypts a fixed-size vector, and the homomorphic operations on the ciphertext are performed slot-wise on the elements of the plaintext vector. To utilize the SIMD feature, more than one input element is packed and encrypted in every ciphertext. This ciphertext packing enables parallelization of addition and multiplication operations. That said, the packing method used can dramatically affect the latency (i.e., time to perform computation), throughput (i.e., number of computations performed in a unit of time), communication costs, and memory requirements. Comparing numbers under HE and specifically CKKS often relies on polynomial approximations of the Step( ) or Sign( ) functions, whereas the accuracy and performance of these methods rely on the degrees of these polynomials. These comparison functions are denoted by Eq(x, y)≈1 ⇔ x=y, and Eq≈0 otherwise.

More generally, homomorphic encryption enables the construction of programs for any desirable functionality, which can be run on encrypted inputs to produce an encryption of the result. Because such a program need never decrypt its inputs, it can be run by an untrusted party without revealing its inputs and internal state. Toolkits for implementing homomorphic encryption are known. A well-known toolkit is HElib, an open-source project. The current version of HElib supports addition and multiplication operations of arbitrary numbers in binary representation, using encryption of the individual bits.

The following provides additional details regarding CKKS.

CKKS is a homomorphic encryption scheme for approximate arithmetic. It enables homomorphic operations on encrypted data, e.g., where that data has been quantized from some real-world data (e.g., financial, medical, etc.) to an approximate value such as floating-point number to enable the data to be represented by a finite number of bits. The approximate value may substitute for the real-world data, and any rounding error is designed to be small enough so as to avoid impacting the computation. In approximate arithmetic, a few numbers of significant digits (most significant bits (MSBs)) are stored, and the arithmetic operations are carried out between them, with the result rounded by removing some inaccurate least significant bits (LSBs). CKKS enables an approximate addition and multiplication of encrypted messages, and it includes a rescaling operation for managing the size of plaintext. In operation, CKKS truncates a cyphertext into a smaller modulus, which leads to rounding of plaintext. For security purposes, and following the MSBs that contain a message, a noise (sometimes referred to an encryption noise) is added. This noise also is considered to be a part of the error occurring during approximate computations and that is reduced along with plaintext by rescaling. As a result, a decryption structure outputs an approximate value of plaintext with a predetermined precision. The CKKS scheme includes a scaling factor that enables control over encoding and decoding errors that occur during the plaintext rounding process.

More formally, CKKS provides for a method for efficient approximate computation on HE. In this technique, and as noted above, the encryption noise is treated as part of error occurring during approximate computations. An encryption c of message m by a secret key sk has a decryption structure in the form of: $\langle c, sk \rangle = m + e (\bmod q)$, where e is a small error inserted to guarantee the security of hardness assumptions. If e is small compared to the size of the message, the noise does not affect the significant figures of m, and thus $m' = m + e$ can replace the original message in approximate arithmetic. In this process, and as also noted, a scale factor may be multiplied to the message before encryption to reduce the precision loss from encryption noise. For homomorphic operations, the decryption structure is small compared to a ciphertext modulus, and the above-mentioned rescaling operation reduces the size of the ciphertext modulus and ensures that the bit size of the ciphertext modulus grows linearly (instead of exponentially) with the depth of a circuit.

Machine Learning-as-a-Service Using Homomorphic Encryption (ML Over HE)

Figure 2:
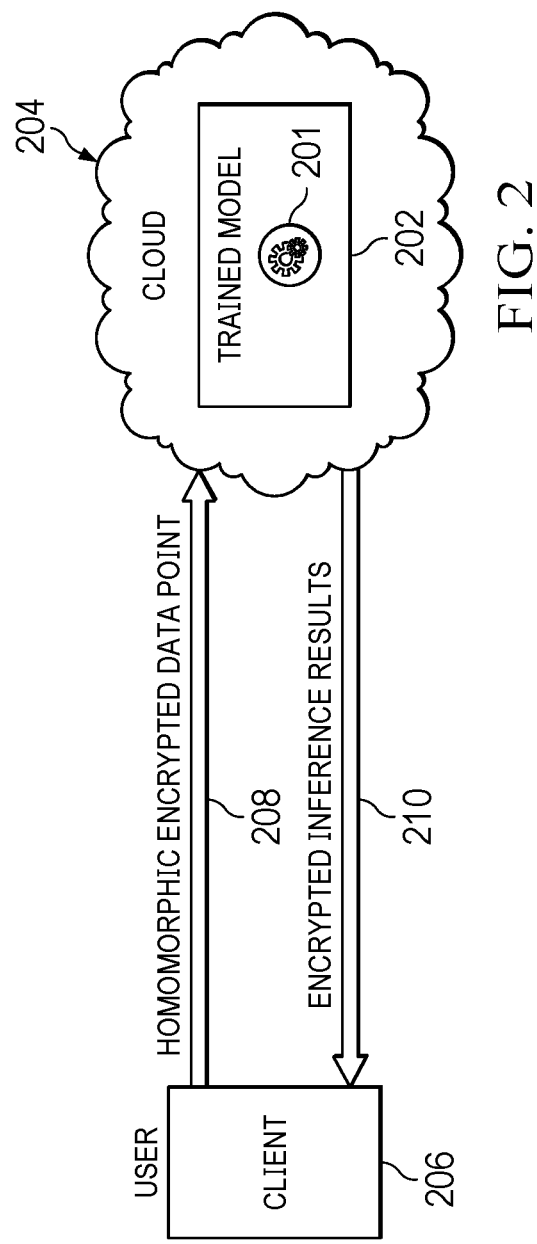
FIG. 2 is a representative Machine Learning as-a-service (MLaaS) operating environment in which the techniques of this disclosure may be implemented.

With reference now to FIG. 2, a representative (but non-limiting) operating environment for the technique herein is depicted. As shown, in a typical machine learning (ML) as a service scenario, a trained model such as a decision tree 201 is hosted on a cloud server 202 (sometimes referred to herein as Cloud) in a cloud computing infrastructure 204 such as described above. The model/tree (or other decision logic) 201 may be exposed as an Application Programming Interface (API) on the cloud 204. In operation, and as a service, the hosting cloud server 202 allows users to run inference queries on the model/tree 201. Typically, a user (sometimes referred to herein as Client) is associated with a client machine 206, and the client and server are configured to operate according to a client-server model. A homomorphic encryption (HE) protocol is enforced across the client-server operating environment such that the Cloud protects the model's privacy while users (Clients) maintain the privacy of their scoring data points returned by the model/tree. In a typical request-response workflow, the client 206 sends an encrypted query 208 (e.g., a data point) to the cloud server 202, the cloud server 202 applies the model/tree 201 and then returns a response 210. The response includes the encrypted inference results. In this manner, privacy-preserving inference problems are securely evaluated.

Thus, as depicted in FIG. 2, the Client homomorphically-encrypts its data points and shares them with the Cloud. In this example, the Cloud then uses the public key received from the Client to encrypt its model, and it homomorphically-evaluates the decision tree on the encrypted data points. The Cloud does not need to encrypt its model before using on inference on the encrypted data point supplied by the user. This is because CKKS (and other schemes) allow computations to be performed that involve both ciphertexts (like the user's data point) and plaintexts (e.g., the Cloud's model).

Generalizing, and as described above, PPML that use HE (sometimes referred to herein as ML over HE) typically involve two entities: a user (client), and a semi-honest cloud server that performs Machine Learning (ML) computation on HE-encrypted data. The user can train a model locally, encrypt it, and upload it to the cloud. In such case, the model architecture and its weights are not considered a secret from the user, but only from the cloud. Alternatively, the user can ask the cloud to train a model on her/his behalf over encrypted/unencrypted data and, at a later stage, perform inference operations (again, on the user's behalf) using the trained model. In some scenarios, the model is a secret and should not be revealed to the user, who receives only the classification or prediction output (the result of the inferencing). It is assumed that all communications between all entities are encrypted using a secure network protocol, e.g., TLS 1.3, that provides confidentiality and integrity, and that allows the users to authenticate the cloud server.

These above-described use case is not intended to be limiting.

ML with HE One-Hot Maps Using Intermediate CRT Maps

With the above as background, the following describes the techniques of this disclosure. As will be described, the techniques facilitate secure computations under Homomorphic Encryption (HE) and in a bandwidth- and latency-efficient manner when implemented in the client-server based architecture described above.

In a first aspect, and when viewed from the perspective of the server that performs Machine Learning (ML) computation on HE-encrypted data, a method begins with the server receiving from a client an encrypted data point that encrypts one or more elements, such as input elements of a plaintext vector. In this example, at least one element is associated with a plaintext number. Advantageously, the plaintext number is represented in the encrypted data point as a set of small one-hot maps, each of the set of one-hot maps corresponding to a coprime factor computed for the plaintext number using a Chinese Remainder Theorem (CRT) encoding. As used herein, each small one-hot map is sometimes referred to herein as CRT "intermediate" map (or by the "sub-map" shorthand), as it is based on one of the coprime factors. Using the set of small one-hot maps, and under homomorphic encryption, a one-hot map representation of the plaintext number is then generated by the server. Relative to the size of the one-hot map representation, the aggregate size of the set of one-hot maps is significantly less. Thus, while the generation operation has some processing latency, that latency is still less than the latency that would otherwise be required to generate the one-hot map representation from the plaintext number directly. After the server obtains (recovers) the full one-hot map from the set of small CRT maps, and once again under homomorphic encryption, the server then performs an operation on the full one-hot map (of the plaintext number) and, in response, generates a result (which is encrypted). A representative operation is a comparison operation associated with evaluation of a decision tree. The result is then provided back to the client as a response to the encrypted data point. The result may be provided during the actual request-response flow when the encrypted data point is received at the server: alternatively, the result may be stored e.g., in an online database or other accessible data store, and from which at a later time the client can retrieve and decrypt it.

Figure 3:
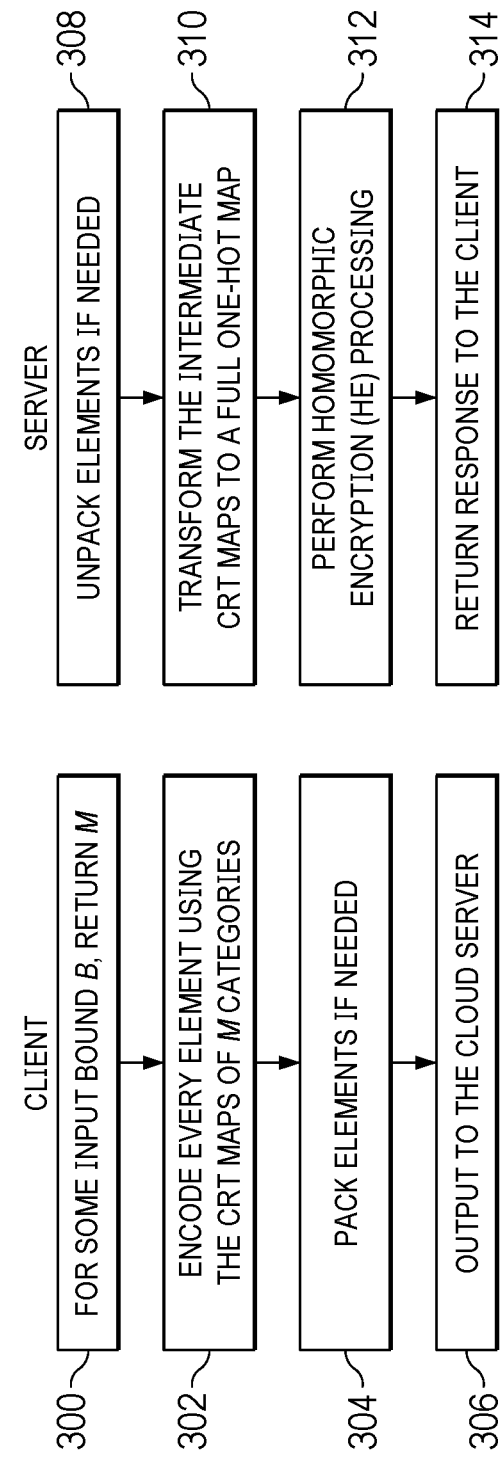
FIG. 3 depicts a client-to-server workflow utilizing the techniques of this disclosure.

On the client-side, and during the generation of the encrypted data point that will be sent to the server, the client is configured to generate the intermediate CRT maps. The overall client-to-server interaction is then as depicted in the example process flow in FIG. 3. In this example embodiment, the HE scheme is CKKS, and SIMD is enabled. The process begins at step 300 for some input bound B, return $M=N+\operatorname{argmin}(\operatorname{maxn}_i)$, where $x=0, \ldots, B$ and $N+x=\Pi n_i$. When the number to be represented has coprime factors and can be used to generate a "nice" CRT representation (i.e., a representation that splits into coprime factors nicely), it is used directly; when the number does not have a nice CRT representation (e.g., because it does not include coprime factors), however, preferably it is first artificially extended by searching for the first "nice" integer N+x that has a nice CRT representation. By way of example, and considering the equation in step 300, assume that N=5,591, which is a prime number. In this case, the number cannot be split into small coprime factors and thus cannot use the subject method. To resolve this case, consider the number M=5,610 (equal to 2×3×5×11×17), splits nicely into these coprime factors. Because the technique considers one-hot maps, it can be assumed that all slots 5,592 through 5,610 are zeros (padding). To find an M that splits nicely and is the closest to N (and thus avoids too much storage inflation), two methods may be used. Step 300 is the first method, namely, set a bound B and check all the number N . . . N+B to see what number has the smallest coprime factors and is closest to N. An alternative is to start from a list of small primes (2, 3, 5, 7, 11, 13, . . . ) and find the first combination that is the closest to N.

At step 302, the client encodes every element using the CRT maps of M categories. If needed, and at step 304, the client packs the elements together. At step 306, the data (in this example the set of intermediate CRT maps for each input element) is delivered over the network to the cloud server. At step 308, the server unpacks the elements if needed (based on any packing that occurs at step 304). At step 310, the server transforms the CRT small maps to a full one-hot map (per element). At step 312, the server then uses the full one-hot maps for the elements for further HE processing, such as performing one or more comparison operations during the HE-based processing of a decision tree. At step 314, the server returns a result to the client to complete the processing.

According to this disclosure, the use of intermediate CRT maps provides for significant efficiencies in the overall client-to-server based processing. The following provides a detailed explanation of how these efficiencies are realized.

By way of background, as used herein, the following symbols and notation are used. In particular, numbers are identified using low-case letters, e.g., a, b, c, and vectors are denoted by bold face letters, e.g., v, w. To access a specific element $0 \le i < n$ in a vector v, square brackets are used, e.g., v[i]. A dot-product operation of two vectors, $v_1$, $v_2$ is denoted by $\langle v_1, v_2 \rangle$. One-hot maps are represented by the letter o. A one-hot map that represents n categories is an n-bits vector $o \in \{0,1\}^n$ where $\Sigma_{i=0}^{n-1} o[i]=1$, i.e., all bits but one are 0. A mathematical ring with addition (+) and multiplication (*) operations is denoted by $\mathcal{R}(+,*)$.

As noted above, a one-hot map represents n categories is an n-bits vector $o \in \{0,1\}n$ where $\Sigma_{i=0}^{n-1} o[i]=1$, i.e., all bits but one are 0. In general, the one-hot map slots can represent any set of categories (c), e.g., c=['dog','cat','bird'] or c=[0.9, 0.7, 1.57]. The set $\{0, 1, \ldots, n-1\}$ is denoted by [n]. One commonly-used example for c is the quantization of a floating point element in some fixed range. For example, a floating point value $a \in [1,2]$ can be converted into one of 6 categories: $c_a=[1, 1.2, 1.4, 1.6, 1.8, 2]$, where the bijective function $\phi: c_a \rightarrow [n]$, where $\phi(a)=5a-4$ is used. This map is easily implemented under HE if needed using one multiplication and one addition.

Known approaches assume that these maps are precomputed by the user before encryption and thus their costs are negligible. In practice, however, and as noted above, this computation can lead to huge overhead costs of memory and bandwidth, which many applications try to avoid.

According to this disclosure, a new input representation that is based on the Chinese Remainder Theorem (CRT) and that offers a valuable trade-off between latency and bandwidth is described. In mathematics, the CRT states that if one knows the remainders of the Euclidean division of an integer n by several integers, then one can determine uniquely the remainder of the division of n by the product of these integers, under the condition that the divisors are pairwise coprime (no two divisors share a common factor other than 1). In particular, two integers a and b are coprime if the only positive integer that is a divisor of both of them is 1, i.e., any prime number divides a does not divide b, and vice versa. This is equivalent to their greatest common divisor (GCD) being 1.

CRT-Based Input Representations

The following section describes several methods for achieving one-hot maps from categorical variables over [n] according to this disclosure. These include: a CRT representation, a hierarchical CRT representation, and a numeric (hierarchical) CRT representation. These CRT-based techniques provide significant advantages as compared to either conventional input representations, such as one-hot map representation, or numeric representation.

In particular, use of one-hot representation is known. In this scenario, the client directly encodes every one of its number elements as a one-hot map, i.e., n values are encrypted for each element. This method, however, is wasteful with respect to bandwidth, especially where n is of medium size. For example, for n=100, the client encodes 99 zeros and one 1 to represent just one element. When the network transport and storage costs are large, this method becomes unfavorable. In numeric representation, the client submits elements from [n] using an integer representation. Here, the bandwidth and storage costs are low, but converting this representation to a one-hot map representation while encrypted on the cloud side is costly in terms of latency, especially for large values of n.

To address these inefficiencies, and in contrast to the above techniques, a CRT (or CRT-based) representation is implemented. This approach involves the client submitting a special type of one-hot map of the CRT representation of every element and then having the server expand these one-hot maps in an online phase. This type is an intermediate one-hop map that is associated with a particular coprime factor of the CRT computation. In this approach, and as will be seen, the size of all the intermediate one-hot maps (taken together, see below) is much smaller compared to the size of a full-size one-hot map (the one-hot representation approach described above), and the latency to expand them into the full-size one hot map is lower as compared to transforming an integer element into a one-hot map (the numeric representation approach described above). Through use of this intermediate CRT-based encoding scheme, the overall computational efficiency of using HE-based scheme is increased.

The intermediate CRT-based encoding works as follows. Specifically, consider the case for $a \in [n]$, where n is a composite number with coprime factors. In number theory two integers a and b are said to be coprime if the only positive integer that is a divisor of both of them is 1, i.e., any prime number divides a does not divide b, and vice versa. This is equivalent to their greatest common divisor (GCD) being 1. Thus, and in the present context, $n = n_1 \cdot n_2 \ldots n_k$, where $GCD(n_i, n_j) = 1$, for $i \neq j$. In that case, and according to this embodiment, a set of k one-hot maps $o_{a,i}$ of $n_i$ slots, respectively, is generated, where $o_{a,i}[a (mod n_i)] = 1$, and where the other slots of $o_{a,i}$ are set to 0. These k one-hot maps are the "intermediate" CRT maps (or sub-maps). The total size of these maps is then $\Sigma_{i=1}^{k} n_i$, which advantageously is much smaller than n.

In this embodiment, any n even without coprime factors can be chosen. In such case, the [n] map is then embedded into an [m]-map, where n<m and m has coprime factors, and the extra slots are set to zero. For example, let n=10,000, and choose to work with m=2*5*7*11*13=10,010, and where the number of required slots is r=38. Generalizing, there may be different heuristics to find the smallest m or r values, e.g., a brute-force search over all different combinations of the l smallest primes, setting a limit t and considering all numbers $m \in [n, n+t]$, and so forth.

The CRT representation such as described above is limited to coprime factors. According to another embodiment of this disclosure, another approach to the input representation uses CRT representation in a hierarchical way. In this scenario, the coprime restriction is considered (enforced) but separately at every hierarchy. More formally, start from a number n, compute $n_1 = \lceil \sqrt{n} \rceil$, $n_2 = \lceil \sqrt{n} \rceil + 1$, where $n_1$ and $n_2$ are coprime. The split process is then recursively repeated until reaching a "desired" hierarchy according to latency and bandwidth parameters/constraints.

In the usual case, the client generates the CRT sub-maps for the element and delivers them to the server, which must be then recover the full map from the CRT sub-maps. To this end, the server performs the following recover operation. In particular, the input is the k one-hot sub-maps $o_{a,i}$, which are duplicated $n/n_i$ times, respectively, to the duplicated vectors $(o_{a,i}^d)_{i \leq k}$. Subsequently, all the duplicated maps are multiplied to construct the final map by: $O_a[i] = \Pi_{j=1}^{k} o_{a,j}^d[i]$. As noted above, the cost is n*k multiplications and a multiplication depth of log k.

Figure 4:
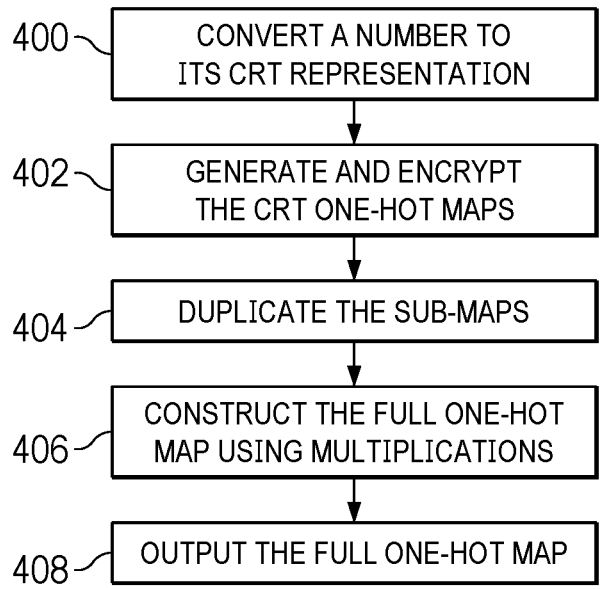
FIG. 4 depicts a process flow of a first embodiment of this disclosure.
Figure 5:
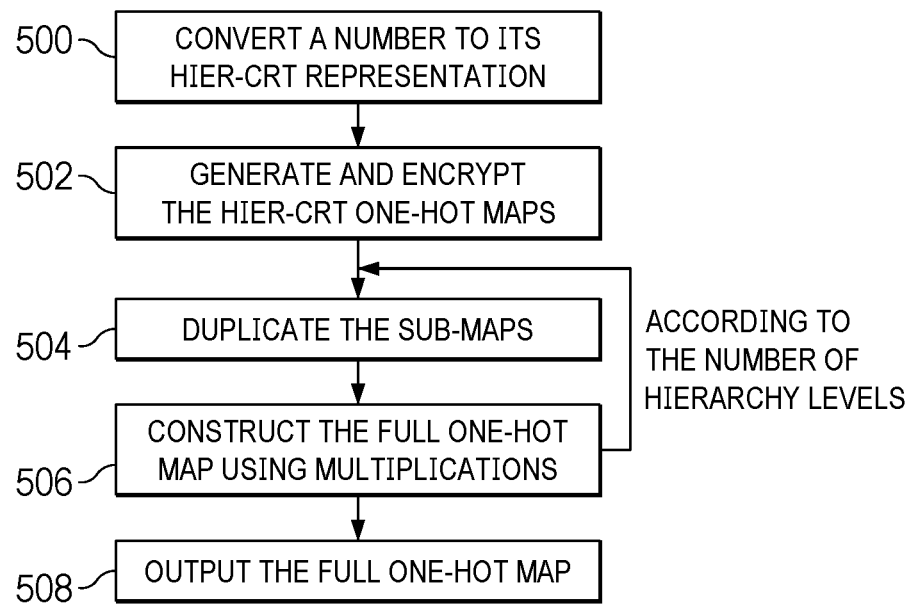
FIG. 5 depicts a process flow of a second embodiment.

The above-described approaches to generating the intermediate maps and recovering the full one-hot representation are shown by the process flows in FIGS. 4 and 5. FIG. 4 in particular depicts the basic CRT representation use case, and FIG. 5 depicts the hierarchical CRT embodiment. Typically, the hierarchical CRT embodiment is used as the number to be encoded is large.

In FIG. 4, the process begins at step 400 (and typically on the client) by converting a number to its CRT representation. At step 402, the client generates and encrypts the intermediate CRT one-hot maps (the sub-maps) corresponding to coprime factors for the number. At step 404, which typically occurs on the server, the sub-maps are duplicated. In particular, and for a given sub-map, this operation duplicates the entries (in the given sub-map) a number of times to generate a vector, the number of times derived by dividing a result of multiplying the coprime factors by the coprime factor for the given sub-map. At step 406, the server constructs the full one-hot map using multiplications of the individual vectors generated for each sub-map. At step 408, the server provides the full one-hot map for further use, typically an HE operation such as a comparison. FIG. 6 depicts an example of the process flow in FIG. 4 for the plaintext number 17. In this example, the coprime factors are 2, 3 and 5. For these values, the one-hot representation is shown at 600, and the associated intermediate CRT maps are shown at 602. As can be seen, whereas the one-hot map 600 has thirty (30) elements, the three intermediate CRT maps together have only ten (10) elements. As noted above, the server duplicates the entries a number of times to generate a vector, the number of times derived by dividing a result of multiplying the coprime factors by the coprime factor for the given sub-map. The resulting vectors are shown at 604. The vectors are then multiplied to generate the full one-hot representation, which for this example is shown at 606.

FIG. 5 depicts the generalized process flow for the hierarchical CRT (Hier-CRT) embodiment. In this embodiment, and as described above, the coprime restriction is enforced at each level of a set of levels comprising the hierarchy. In FIG. 5, the process begins at step 500 (and once again typically on the client) by converting a number to its Hier-CRT representation. At step 502, the client generates and encrypts the intermediate Hier-CRT one-hot maps (the sub-maps). Here, each of the set of levels comprising the hierarchy are processed individually. To that end, and at step 504, and now once again on the server, the sub-maps of a given level are duplicated. In particular, and for a given sub-map, this operation duplicates the entries a number of times to generate the vector, as previously described. At step 506, the server constructs the full one-hot map (for the hierarchical level) using the multiplications of the individual vectors. This processing (steps 504 and 506) is then repeated for each level of the hierarchy. Stated another way, converting an input from a Hier-CRT representation to the on-hot maps representation uses recursively the CRT method (FIG. 4) at every hierarchy. After all iterations are complete (i.e., all of the levels have been processed recursively), the server outputs the full one-hot map at step 508. FIG. 7 depicts an example of the process flow in FIG. 6 for the plaintext number 5,678. In this example, there are then three (3) hierarchies 700. To encode the number in question, the client computes the eight residues values 702 and their respective maps 704, which are then processed in the manner previously described.

In the example depicted in FIG. 7, the client encrypts the 8 maps $O_{a,*}$. A further variant option in this case is just to encrypt the 8 (in this example) representative numerical values, e.g., a*, in which case only eight (8) elements are sent to the server. This latter approach is the numeric CRT representation.

Generalizing, assume for the encoding scheme there are a number of categories N; then, for a ciphertext C with S slots that encrypts only one element X, the approach herein encrypts the element as a set of small one-hot maps. Specifically, and as described above, when $N=n_1*n_2*n_3$, where all $n_i$ are coprime, the set of small one-hot maps are computed per component $n_i$, and this map is denoted map$_i$. This map has $n_i$ slots, where all slots are initialized with 0 except for the slot $o_{a,i}[a(\bmod n_i)]$, which is set to 1. Each small map of map$_i$ can reside in a different ciphertext, or they can be packed in one ciphertext to reduce bandwidth. As has been described, the set of small one-hot maps are expanded on the server side to different ciphertexts, e.g., using masks and rotate operations, before the following algorithm is carried out. The total size of these maps is sum($n_i$), which as noted above is much smaller than n. To build the final one-hot map, every small map map$_i$ is duplicated $N/n_i$ times, at a cost of log ($N/n_i$) rotations and additions. Subsequently, all the duplicated maps are multiplied to construct the final map, but at a cost of only one (1) multiplication. This approach provides for an efficient trade-off of bandwidth and latency, and the approach provides significant advantages especially when N is larger than S and single one-hot does not fit in one ciphertext. Further, when dealing with multiple elements, the approach herein allows the system to pack and unpack many elements together, thereby significantly reducing bandwidth. The approach herein also outperforms one-hot representation in terms of latency for small N values.

The nature of the HE operations that may then be carried out by the server depend on the nature of the inferencing. The one-hot maps generated according to the above-described techniques are used by the ML application, such as decision trees, and in many different ways. One application is a single element comparison. Comparing integers or fixed point numbers can be costly when performed under HE, and specifically CKKS. Using one-hot maps allows for speeding up the comparison process in cases where the range of inputs can be separated into a not-too-large number of categories. In this application, every bit of the one-hot map represents one category. Subsequently, when the application wants to learn whether a number represented using the map represents a specific category, the application uses the relevant bit from the bit-map.

Other applications include, without limitation, greater-equal comparisons, and range comparison.

Packing

The above-described methods use vectors and operations on vectors. Typically, and in practical HE application these vectors are stored inside ciphertexts, and the operations involve SIMD operations on these ciphertexts. The way the vectors are stored inside the ciphertexts is called the packing scheme and, as noted above, the scheme used can significantly impact both bandwidth and latency. Consider for example m one-hot maps of size n that require a total of mn elements to pack, and consider ciphertexts of size s, such that m≤s and n≤s. Assume further that all three values are close to each other. Several packing options are then as follows: (1) each of the m elements can be stored in a single ciphertext containing the entire one-hot vector; or (2) each number can be stored by being spread across n ciphertexts, where the $i^{th}$ slot in each ciphertext contains the one-hot encoded value for the $i^{th}$ sample. According to a further feature of this disclosure, the one-hot encoding may leverage a data structure known as a tile tensor. Tile tensors provide a framework for specifying the above-described extreme packing options, as well as intermediate packing options. This is done by providing packing-oblivious code that operates on tensors. The tensors are partitioned to parts (tiles) that are mapped to slots of ciphertexts. Setting a different shape to the tiles yields a different packing scheme.

In particular, consider a matrix of size [m, n] where of the m rows is the one-hot encoded vector of the $m^{th}$ sample. The tile tensor shape notation [m/$t_1$, n/$t_2$] means that the matrix is divided into (sub-blocks) tiles of size [$t_1$, $t_2$], and each tile is stored in one ciphertext, so that s=$t_1 t_2$. For example, [m/1, n/s] means the tile's shape is [1, s], so that each row of each matrix is stored in a separate ciphertext. Alternately, [m/s, n/1] means that each column is stored in a separate ciphertext. Other, more complex operations are also possible. For example, if s=1024, the tile shape may be chosen as $$\left[\frac{m}{16}, \frac{n}{64}\right],$$

meaning that the matrix is divided into tiles of size [16, 64], and each one is stored (flattened) in a ciphertext.

Typically, the choice of packing depends on the HE algorithm.

In an example implementation, the techniques herein are implemented in IBM® HE4Cloud, an FHE service that enables data scientists to deploy privacy preserving machine learning driven Software-as-a-Service (SaaS) applications in the cloud. The FHE service is powered by HELayers, an FHE Artificial Intelligence (AI) Software Development Kit (SDK). HELayers also provides a tile tensors framework that abstracts the packing decision for the user.

Experimental Data

Figure 8:
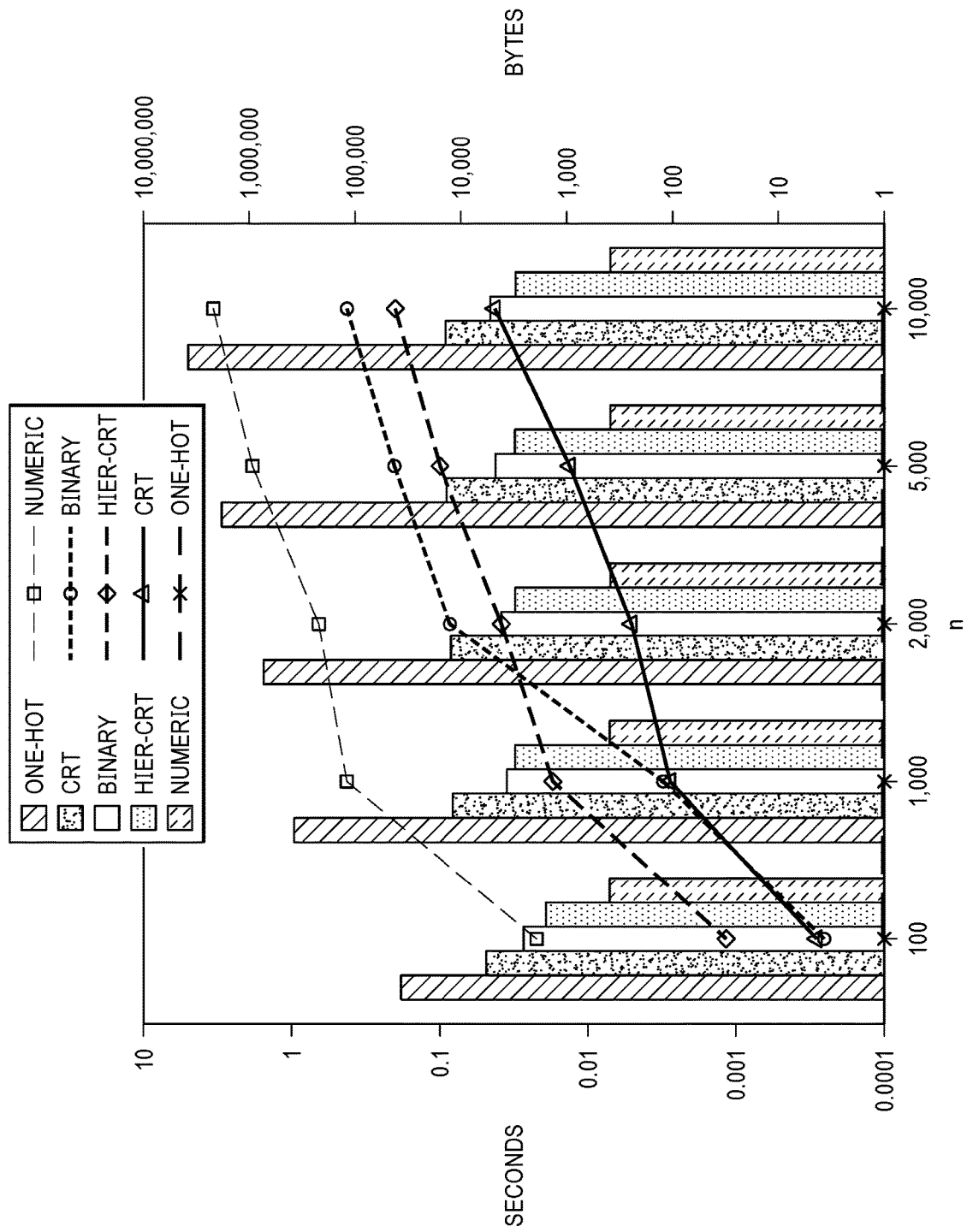
FIG. 8 depicts a comparison of the amortized bandwidth and amortized latency per element of generating one-hot maps from different input representations for a batch of m elements and different values of n, and when setting a tile tensor shape.

FIG. 8 depicts a comparison of the amortized bandwidth and amortized latency per element of generating one-hot maps from different input representations for a batch of m elements and different values of n, and when setting a tile tensor shape to $$\left[\frac{n}{1}, \frac{m}{s}\right].$$

Both y axis scales are logarithmic. In this experiment, five n values from small n=100 to large n=10,000 were considered, together with five different representations: (a) one-hot map of size n; (b) numeric representation, where the input is a number a∈[n]; (c) CRT, where for example n=100, the input is three one-hot arrays of sizes 3, 5 and 7 (3×5×7=105), and for n=10,000 the input is five one-hot arrays of sizes 2, 5, 7, 11 and 13 (2×5×7×11×13=10,010); (d) binary, for n=100 and n=10,000 the client sends 7 and 14 bits, respectively, (e) hierarchical CRT, where for example for n=100, the client sends one-hot arrays for ((amod 10)mod 3, (amod 10)mod 4, (amod 11)mod 3, (amod 11)mod 4)

of sizes 3, 4, 3, 4, respectively, and for the n=10,000 case, the client sends the maps of sizes 3, 4, 3, 4, 3, 4, 3, 4 from which a one-hot array for a∈[10,000] can be computed.

For this experiment, HE parameters were selected as follows. A bootstrappable context with ciphertexts with s=$2^{15}$ slots, a multiplication depth of 12, fractional part precision of 42, and an integer part precision of 18. Further, all cases used a batch m of s samples that were packed together in one ciphertext. For the n=100 case, a polynomial of degree $7^4$ (a composition of 4 polynomials of degree 7), with a multiplication depth of 12, was used; the resulting maximum error was 0.02. For the n=10,000 case, a polynomial of degree 77, with a multiplication depth of 21, was used; the resulting maximum error was 0.04. The error was virtually 0 in the CRT and Hier-CRT cases.

As FIG. 8 depicts, an extreme case (designated "one-hot")) is when the client sends the entire one-hot array and the server does nothing. The other extreme case (designated "numeric") is when the client transmits a single number (numeric representation) and the server does a full transformation.

The technique of this disclosure provides significant advantages. The CRT and hierarchical CRT methods described herein provide a way to represent data in a compressed way and from which one-hot maps are efficiently generated under homomorphic encryption. Using this technique the overall computational efficiency of using the HE-based scheme is increased. The approach enables more efficient comparisons to be carried out (e.g., decision tree, XGBoost, etc.) The technique is readily integrated with existing HE capabilities and facilitates enhanced PPML solutions under HE. Using this approach data scientists have additional and valuable tools in their AI-over-HE toolbox. Generalizing, the method according to this disclosure may be implemented as a standalone approach, e.g., a software-based function executed by a processor, or it may be available as a managed service (including as a web service via a SOAP/XML interface). The particular hardware and software implementation details described herein are merely for illustrative purposes, and they are not meant to limit the scope of the described subject matter.

More generally, computing devices within the context of the disclosed subject matter are each a data processing system (such as shown in FIG. 1) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As also depicted in FIG. 1, the scheme described herein may be implemented in or in conjunction with various server-side architectures including simple n-tier architectures, web portals, federated systems, and the like. The techniques herein may also be practiced in whole or in part in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the HE system and the CRT transformation code are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As already mentioned, the techniques disclosed herein are not limited to any particular homomorphic encryption protocol such as CKKS, but this will be a typical implementation. More generally, the approach herein may be implemented in CKKS, any CKKS derivative, or in any similar HE scheme that supports real values with scales.

The techniques herein provide for improvements to another technology or technical field, namely, homomorphic inferencing systems, as well as improvements to the operational capabilities of such systems when used in the manner described.

The nature of the data that is subject to the homomorphic inferencing is dependent on the application and is not intended to be limited. Example data types include financial, medical, genomic, measurement data, testing data, and so forth.

Having described the subject matter, what is claimed is as follows:

The invention claimed is:

1. A method implemented in part on at least one processor for secure computations under Homomorphic Encryption (HE), comprising:
receiving an encrypted data point that encrypts one or more elements, wherein at least one element is associated with a plaintext number, the plaintext number being represented in the encrypted data point as a set of one-hot maps, each of the set of one-hot maps corresponding to a coprime factor computed for the plaintext number using a Chinese Remainder Theorem (CRT) encoding;
under homomorphic encryption, generating a one-hot map representation of the plaintext number using the set of one-hot maps;

under homomorphic encryption, performing an operation on the one-hot representation and generating a result; and providing the result as a response to the encrypted data point.

2. The method as described in claim 1 wherein generating the one-hot map representation comprises:

for a given one-hot map of the set of one-hot maps, duplicating the given one-hot map a number of times to generate a vector, the number of times derived by dividing a result of multiplying the coprime factors by the coprime factor for the given one-hot map; and multiplying the vectors.

3. The method as described in claim 1 wherein the plaintext number is a number without coprime factors and that has been padded with one or more zeros.

4. The method as described in claim 1 wherein the operation is a comparison operation associated with evaluation of a decision tree.

5. The method as described in claim 1 wherein the homomorphic encryption is based on a Cheon-Kim-Kim-Song (CKKS) scheme.

6. The method as described in claim 1 wherein the one or more elements are arranged according to a tile tensor-based packing scheme.

7. The method as described in claim 1 wherein the CRT encoding is hierarchical, and wherein generating the one-hot map representation is recursively repeated at each hierarchy.

8. An apparatus, comprising:

a processor;

computer memory holding computer program instructions executed by the processor to provide secure computations under Homomorphic Encryption (HE), the computer program instructions comprising program code configured to:

receive an encrypted data point that encrypts one or more elements, wherein at least one element is associated with a plaintext number, the plaintext number being represented in the encrypted data point as a set of one-hot maps, each of the set of one-hot maps corresponding to a coprime factor computed for the plaintext number using a Chinese Remainder Theorem (CRT) encoding;

under homomorphic encryption, generate a one-hot map representation of the plaintext number using the set of one-hot maps;

under homomorphic encryption, perform an operation on the one-hot representation and generating a result; and provide the result as a response to the encrypted data point.

9. The apparatus as described in claim 8 wherein the program code configured to generate the one-hot map representation comprises program code configured to:

for a given one-hot map of the set of one-hot maps, duplicate the given one-hot map a number of times to generate a vector, the number of times derived by dividing a result of multiplying the coprime factors by the coprime factor for the given one-hot map; and multiply the vectors.

10. The apparatus as described in claim 8 wherein the plaintext number is a number without coprime factors and that has been padded with one or more zeros.

11. The apparatus as described in claim 8 wherein the operation is a comparison operation associated with evaluation of a decision tree.

12. The apparatus as described in claim 8 wherein the homomorphic encryption is based on a Cheon-Kim-Kim-Song (CKKS) scheme.

13. The apparatus as described in claim 8 wherein the one or more elements are arranged according to a tile tensor-based packing scheme.

14. The apparatus as described in claim 8 wherein the CRT encoding is hierarchical, and the computer program code configured to generate the one-hot map representation is recursively repeated at each hierarchy.

15. A computer program product in a non-transitory computer readable medium, the computer program product holding computer program instructions that, when executed by a first processor in a first processing system and a second processor in a second processing system, provide secure computations under Homomorphic Encryption (HE), the computer program instructions comprising program code configured to:

generate an encrypted data point that encrypts one or more elements, wherein at least one element is associated with a plaintext number, the plaintext number being represented in the encrypted data point as a set of one-hot maps, each of the set of one-hot maps corresponding to a coprime factor computed for the plaintext number using a Chinese Remainder Theorem (CRT) encoding;

output the encrypted data point from the first processing system;

receive the encrypted data point at the second processing system;

under homomorphic encryption, generate a one-hot map representation of the plaintext number using the set of one-hot maps;

under homomorphic encryption, perform an operation on the one-hot representation and generate a result; and provide the result as a response to the encrypted data point from the second processing system.

16. The computer program product as described in claim 15 wherein the program code configured to generate the one-hot map representation comprises program code configured to:

for a given one-hot map of the set of one-bot maps, duplicate the given one-hot map a number of times to generate a vector, the number of times derived by dividing a result of multiplying the coprime factors by the coprime factor for the given one-hot map; and multiply the vectors.

17. The computer program product as described in claim 15 wherein the plaintext number is a number without coprime factors and that has been padded with one or more zeros.

18. The computer program product as described in claim 15 wherein the operation is a comparison operation associated with evaluation of a decision tree.

19. The computer program product as described in claim 15 wherein the one or more elements are arranged according to a tile tensor-based packing scheme.

20. The computer program product as described in claim 15 wherein the CRT encoding is hierarchical, and the computer program code configured to generate the one-hot map representation is recursively repeated at each hierarchy.

* * * * *